US012695252B2

(12) United States Patent
He et al.

(10) Patent No.: US 12,695,252 B2
(45) Date of Patent: Jul. 28, 2026

(54) ELECTRICAL CONNECTOR WITH A GROUND WIRE SPACER STRUCTURE

(71) Applicant: Shenzhen Alex Connector Co Ltd, Shenzhen (CN)

(72) Inventors: Xiling He, Shenzhen (CN); Huilin Wu, Shenzhen (CN); Jijian Wei, Shenzhen (CN); Haiqiu Lu, Shenzhen (CN); Xiao'an Wang, Shenzhen (CN); Xiaobin Wang, Shenzhen (CN); Jun Yang, Shenzhen (CN); Zhaoyang Tang, Shenzhen (CN); Di Jiang, Shenzhen (CN); Mingliang Xia, Shenzhen (CN); Junzhong Liu, Shenzhen (CN)

(73) Assignee: Shenzhen Alex Connector Co Ltd, Shenzhen (CN)

( * ) Notice: Subject to any disclaimer, the term of this patent is extended or adjusted under 35 U.S.C. 154(b) by 311 days.

(21) Appl. No.: 18/399,915

(22) Filed: Dec. 29, 2023

(65) Prior Publication Data

US 2025/0079769 A1 Mar. 6, 2025

(30) Foreign Application Priority Data

Aug. 31, 2023 (CN) ........................ 202322394149.X

(51) Int. Cl.
*H01R 13/6588* (2011.01)
*H01R 13/50* (2006.01)
(Continued)

(52) U.S. Cl.
CPC ......... *H01R 13/6588* (2013.01); *H01R 13/50* (2013.01); *H01R 13/6585* (2013.01);
(Continued)

(58) Field of Classification Search
CPC H01R 13/6588; H01R 13/50; H01R 13/6585; H01R 13/6589; H01R 13/65917;
(Continued)

(56) References Cited

U.S. PATENT DOCUMENTS 6,767,225 B1 7/2004 Hwang
11,217,941 B1 1/2022 Yang
(Continued)

FOREIGN PATENT DOCUMENTS

CN 216563859 U * 5/2022

*Primary Examiner* — Justin M Kratt

(57) ABSTRACT

A ground wire spacer structure of a connector, including two groups of connector monoblocks that are symmetrical and spliced, wherein any group of the connector monoblocks include a housing provided with: a plurality of groups of elastic pieces, wherein one end of the elastic piece is connected to a female socket of the connector, and the other end of the elastic piece is connected to a wire group of the connector; a plurality of metal spacers distributed between two adjacent groups of the elastic pieces and used to separate the elastic pieces; and a conductive sheet mounted on the housing, wherein the conductive sheet is abutted against the plurality of spacers, the conductive sheet is connected to a ground wire in the wire group, and the metal spacers and the conductive sheet form a plurality of independent spaces for accommodating the elastic pieces respectively.

9 Claims, 2 Drawing Sheets

(51) Int. Cl.

| | |
|---|---|
| ***H01R 13/6585*** | (2011.01) |
| ***H01R 13/6589*** | (2011.01) |
| ***H01R 13/6591*** | (2011.01) |
| ***H01R 13/6596*** | (2011.01) |
| *H01R 13/40* | (2006.01) |
| *H01R 13/405* | (2006.01) |
| *H01R 13/46* | (2006.01) |
| *H01R 13/514* | (2006.01) |
| *H01R 13/6581* | (2011.01) |
| *H01R 13/6592* | (2011.01) |
| *H01R 13/6598* | (2011.01) |

(52) U.S. Cl.

CPC ... *H01R 13/6589* (2013.01); *H01R 13/65917* (2020.08); *H01R 13/6596* (2013.01); *H01R 13/40* (2013.01); *H01R 13/405* (2013.01); *H01R 13/46* (2013.01); *H01R 13/514* (2013.01); *H01R 13/6581* (2013.01); *H01R 13/6591* (2013.01); *H01R 13/6592* (2013.01); *H01R 13/6598* (2013.01)

(58) Field of Classification Search

CPC .. H01R 13/6596; H01R 13/40; H01R 13/405; H01R 13/46; H01R 13/514; H01R 13/6581; H01R 13/6591; H01R 13/6592; H01R 13/6598

See application file for complete search history.

(56) References Cited

U.S. PATENT DOCUMENTS

| | | | | | |
|---|---|---|---|---|---|
| 11,563,315 | B2 | 1/2023 | Chen et al. | | |
| 11,761,471 | B2 | 9/2023 | Ni | | |
| 2004/0002262 | A1* | 1/2004 | Murayama ....... | H01R 13/65918 | 439/607.1 |
| 2016/0141808 | A1* | 5/2016 | Stowers ............... | H01R 13/514 | 439/607.05 |
| 2023/0327378 | A1 | 10/2023 | Li et al. | | |

* cited by examiner

ELECTRICAL CONNECTOR WITH A GROUND WIRE SPACER STRUCTURE

CROSS-REFERENCE TO RELATED APPLICATIONS

The application claims priority of Chinese patent application CN202322394149.X, filed on Aug. 31, 2023, which is incorporated herein by reference in its entireties.

TECHNICAL FIELD

The present utility model relates to the technical field of connectors, and in particular to a ground wire spacer structure of a connector.

BACKGROUND

A connector is a common component that is used for bridging communication between blocked or isolated circuits in a circuitry, so as to allow a current to flow therethrough and enable the circuitry to realize a predetermined function. The connector is an indispensable component in an electronic device, and there are various types of connectors depending on the application object, frequency, power, application environment, and the like.

In existing connectors, the structural stability is poor, and during the signal transmission process, there is no effective separation between two adjacent elastic pieces, such that the elastic pieces are prone to suffering from signal interference, which affects the stability of signal transmission.

SUMMARY

A primary objective of the present utility model is to provide a ground wire spacer structure of a connector, which aims to improve the structure of the connector and improve the anti-interference performance of the connector.

In order to achieve the above objective, the present utility model provides a ground wire spacer structure of a connector, comprising two groups of connector monoblocks that are symmetrical and spliced, wherein any group of the connector monoblocks comprise a housing, and the housing is provided with:

- a plurality of groups of elastic pieces, wherein one end of the elastic piece is connected to a female socket of the connector, and the other end of the elastic piece is connected to a wire group of the connector;
- a plurality of metal spacers, wherein the metal spacers are distributed between two adjacent groups of the elastic pieces and are used to separate the elastic pieces; and
- a conductive sheet mounted on the housing, wherein the conductive sheet is abutted against the plurality of spacers, the conductive sheet is connected to a ground wire in the wire group, and the metal spacers and the conductive sheet form a plurality of independent spaces for accommodating the plurality of groups of the elastic pieces respectively.

Optionally, the metal spacer is provided as a structure made of a copper or stainless steel material.

Optionally, the housing is provided as a plastic housing, and the housing and the elastic piece are provided as a one-piece injection molded structure.

Optionally, two positioning lugs are symmetrically arranged at both ends of the conductive sheet, and the housing is provided with positioning and clamping holes for clamping with the positioning lugs.

Optionally, the female socket is provided with a plurality of female socket spacers docked with the metal spacers and a plurality of partition plates for inserting the metal spacers, and the partition plate is provided with a slot for inserting the metal spacer.

Optionally, one end that is of the metal spacer and that is used to be inserted into the slot is provided with a first inclined guide surface.

Optionally, one end that is of the female socket spacer and that is docked with the metal spacer is provided with a second inclined guide surface corresponding to the first inclined guide surface.

Optionally, the slot has a width greater than that of the metal spacer.

Optionally, any of the connector monoblocks is provided with a positioning post and a positioning hole for being spliced with another connector monoblock.

The present utility model has the beneficial effects that: the structure of the existing connector is improved in that the connector adopts a structural design of two spliced monoblocks, elastic pieces of any connector monoblock are separated by a metal spacer, and a conductive sheet is added, such that the metal spacers and the conductive sheet constitute a plurality of independent regions with a group of elastic pieces contained in each region; and meanwhile, the conductive sheet is connected to a ground wire, such that the conductive sheet is conducted with the ground wire in use, and each of the regions forms a closed space for separating the elastic pieces, which effectively avoids signal dispersion on the elastic pieces, and therefore solves the problem of signal interference between adjacent elastic pieces, improving the stability of signal transmission.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
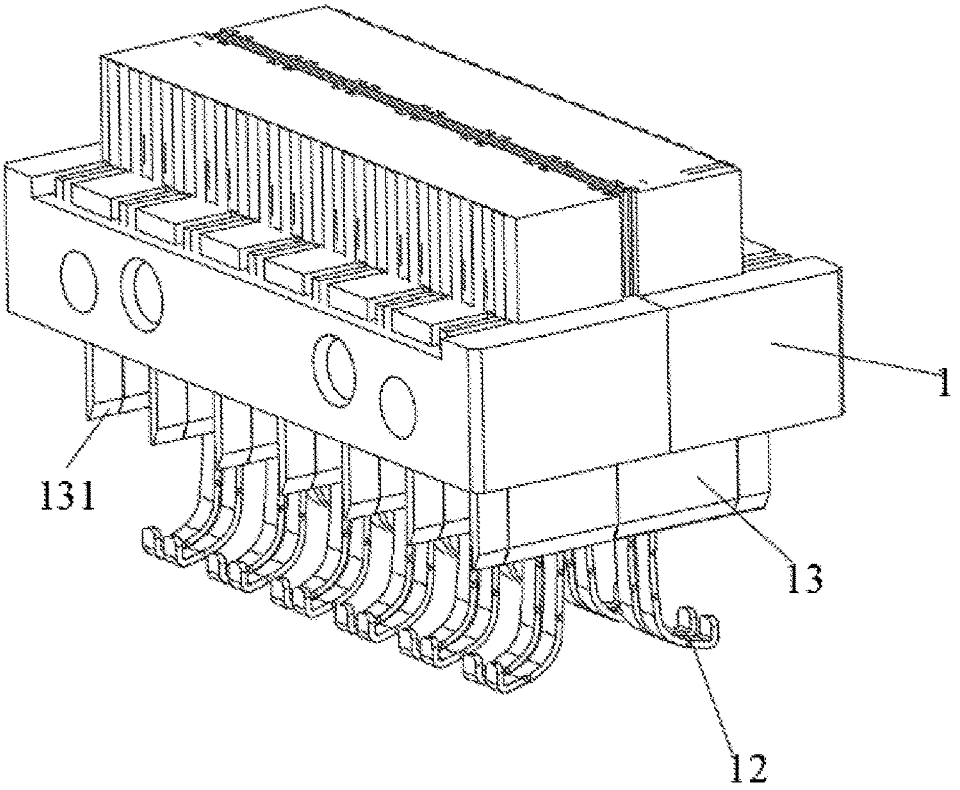
FIG. 1 is a schematic diagram of an overall structure of a connector according to the present utility model.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

Figure 2:
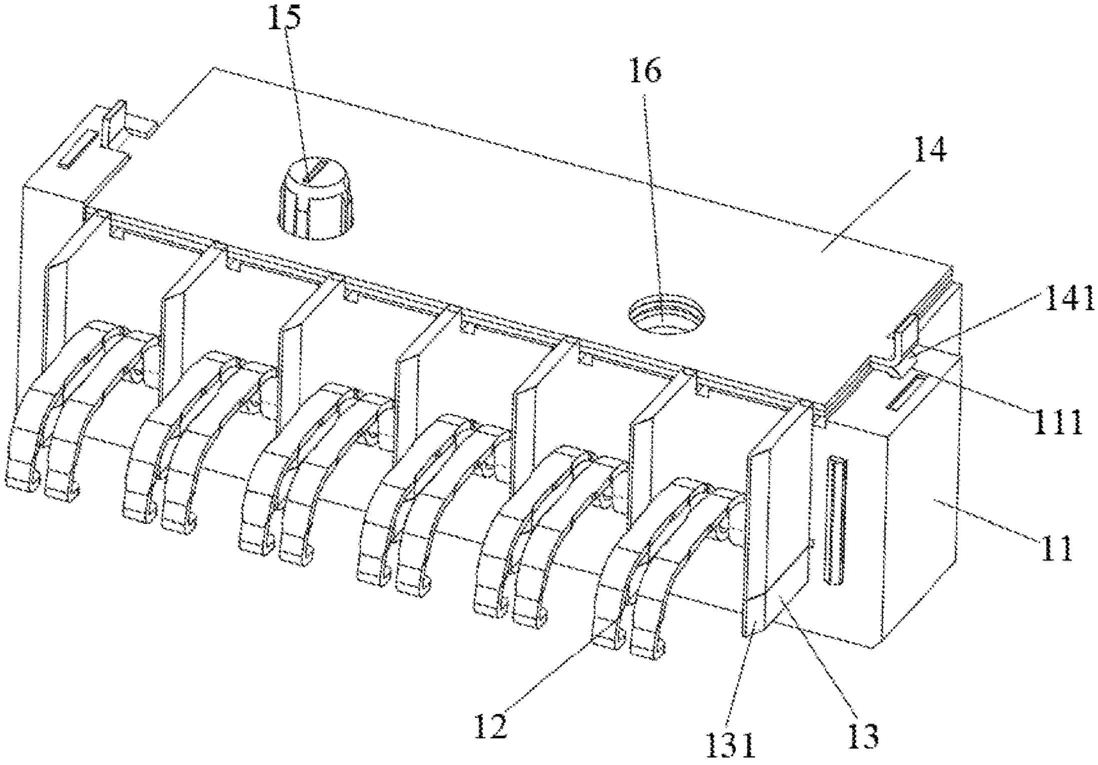
FIG. 2 is a schematic diagram of a structure of a connector monoblock according to the present utility model.

Referring to FIGS. 1 and 2, an embodiment of the present utility model provides a ground wire spacer structure of a connector, comprising two groups of connector monoblocks 1 that are symmetrical and spliced, wherein any group of the connector monoblocks 1 comprise a housing 11, and the housing 11 is provided with:

- a plurality of groups of elastic pieces 12, wherein one end of the elastic piece 12 is connected to a female socket 2 of the connector, and the other end of the elastic piece 12 is connected to a wire group of the connector;
- a plurality of metal spacers 13, wherein the metal spacers 13 are distributed between two adjacent groups of the elastic pieces 12 and are used to separate the elastic pieces 12; and
- a conductive sheet 14 mounted on the housing 11, wherein the conductive sheet 14 is abutted against the plurality of spacers, the conductive sheet 14 is connected to a ground wire in the wire group, and the metal spacers 13 and the conductive sheet 14 form a plurality of independent spaces for accommodating the plurality of groups of the elastic pieces 12 respectively.

This embodiment improves the structure of the existing connector in that the connector adopts a structural design of two spliced monoblocks, elastic pieces 12 of any connector monoblock 1 are separated by a metal spacer 13, and a conductive sheet 14 is added, such that the metal spacers 13 and the conductive sheet 14 constitute a plurality of independent regions with a group of elastic pieces 12 contained in each region; and meanwhile, the conductive sheet 14 is connected to a ground wire, such that the conductive sheet 14 is conducted with the ground wire in use, and each of the regions forms a closed space for separating the elastic pieces 12, which effectively avoids signal dispersion on the elastic pieces 12, and therefore solves the problem of signal interference between adjacent elastic pieces 12, improving the stability of signal transmission.

Further, the metal spacer 13 is provided as a structure made of a copper or stainless steel material to facilitate conduction of the spacer, the conductive sheet 14 and the ground wire of the wires, and a closed space is formed for separating the elastic pieces 12 to avoid signal dispersion from causing signal interference.

Further, the housing 11 is provided as a plastic housing 11 to ensure the insulating property of the housing 11 and improve the use safety, and the housing 11 and the elastic piece 12 are provided as a one-piece injection molded structure, which realizes a simplified manufacturing process, an improved production efficiency, and a reduced cost. Specifically, in this embodiment, the housing 11 and the plurality of metal spacers 13 are injection molded into a one-piece structure, the wire is then mounted in the housing 11, and the conductive sheet 14 is mounted on one side that is of the housing 11 and that is for docking, such that the housing 11 is abutted against each of the metal spacers 13 while being connected to the ground wire; in order to prevent the conductive sheet 14 from not being mounted in place and thus affecting the formation of the closed space, in this embodiment, two positioning lugs 141 are symmetrically arranged at both ends of the conductive sheet 14, and the housing 11 is provided with positioning and clamping holes 111 for clamping with the positioning lugs 141, such that when the conductive sheet 14 is mounted, the two positioning lugs 141 are respectively clamped into the positioning and clamping holes 111 of the housing 11, to position the positioning lugs and prevent them from displacement, and the two connector monoblocks 1 are then spliced together to constitute a complete connector.

Figure 3:
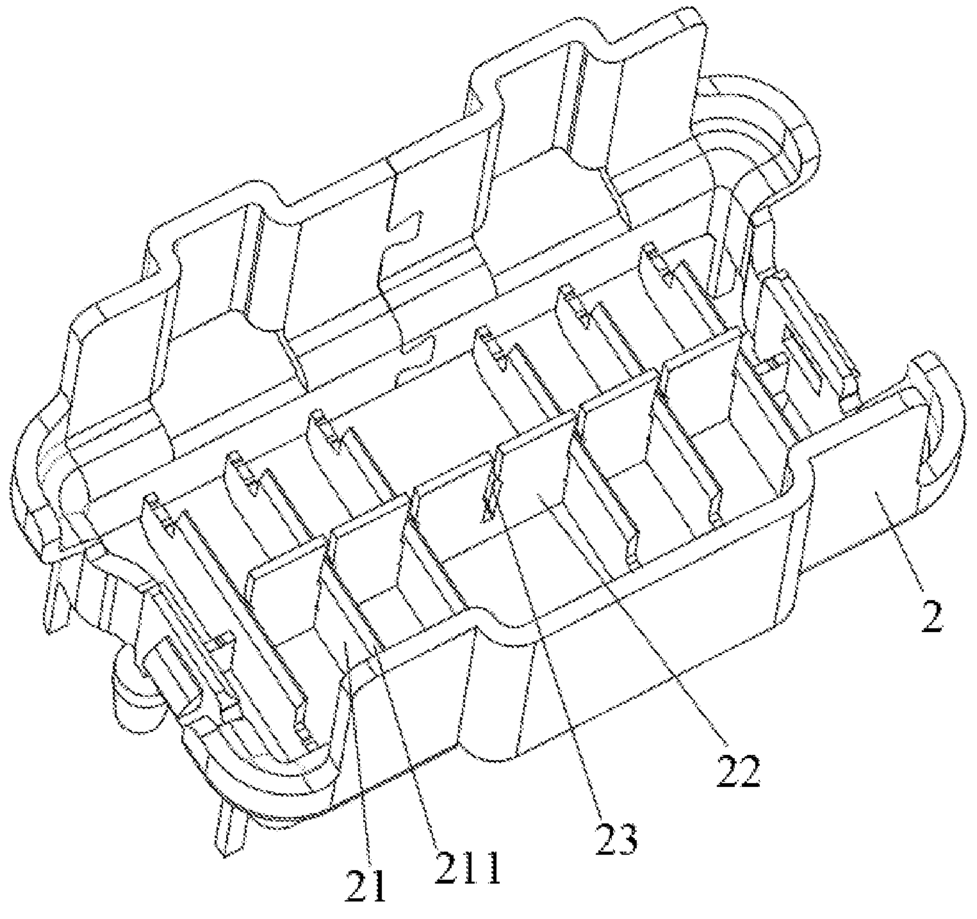
FIG. 3 is a schematic diagram of a structure of a female socket according to the present utility model.

Further, referring to FIG. 3, the female socket 2 is provided with a plurality of female socket spacers 21 docked with the metal spacers 13 and a plurality of partition plates 22 for inserting the metal spacers 13, and the partition plate 22 is provided with a slot 23 for inserting the metal spacer 13.

It should be noted that, in order to connect the elastic piece 12 of the connector to the female socket 2, one end of the elastic piece 12 extends outside the closed space. In this embodiment, in order to ensure the entire elastic piece 12 to be within the closed space after the connector is inserted into the female socket 2, the partition plate 22 and the female socket spacer 21 are added on the metal socket 2 to be docked with the metal spacer 13 of the connector, such that the metal spacer 13 of the connector is docked with the female socket spacer 21 to form the complete closed space in which the elastic piece 12 is totally contained, which further improves the ability to prevent signal dispersion and avoid signal interference.

Further, one end that is of the metal spacer 13 and that is used to be inserted into the slot 23 is provided with a first inclined guide surface 131. In this embodiment, in order to ensure the metal spacer 13 to be smoothly inserted into the slot 23 and to be docked with the female socket spacer 21, the first inclined guide surface 131 is provided at the end of the metal spacer 13, such that the metal spacer 13 is guided during the process of being inserted into the slot 23, to prevent the metal spacer 13 from interfering or clamping with the partition plate 22 and thus affecting the insertion of the metal spacer 13 into the slot.

Further, if one end of the female socket spacer 21 is a flat surface, when individual metal spacers 13 of the connector are different in length due to machining or mounting errors, after the connector is inserted into the female socket 2, the shorter metal spacer 13 may fail to contact the end of the female socket spacer 21, such that the closed space cannot be formed, and signal dispersion occurs to cause signal interference. As such, in this embodiment, one end that is of the female socket spacer 21 and that is docked with the metal spacer 13 is provided with a second inclined guide surface 211 corresponding to the first inclined guide surface 131, and when a front end of the metal spacer 13 contacts the end of the female socket spacer 21, since the two inclined guide surfaces correspond to each other, a space for continuously inserting the metal spacer 13 can be provided, such that the irremovable space in the metal spacer 13 caused by errors is offset, each metal spacer 13 can contact a female socket spacer 21, and signal interference caused by signal dispersion is prevented.

Further, the slot 23 has a width greater than that of the metal spacer 13. Since it is required between the first inclined guide surface 131 and the second inclined guide surface 211 to enable a relative staggered movement between the metal spacer 13 and the female socket spacer 21, in this embodiment, in order to enable the metal spacer 13 to smoothly move a certain distance in a staggered mode, the width of the slot 23 is set to be greater than that of the metal spacer 13, such that a staggering space is left for the metal spacer 13 to facilitate docking of the metal spacer 13 and the female socket spacer 21.

Further, any of the connector monoblocks 1 is provided with a positioning post 15 and a positioning hole 16 for being spliced with another connector monoblock 1, such that the connector monoblock 1 is positioned by the positioning post 15 and the positioning hole 16 when being spliced, which ensures the tightness and precision of the structure.

The above mentioned contents are only optional embodiments of the present utility model and are not intended to limit the patent scope of the present utility model, and under the utility model concept of the present utility model, the equivalent structural transformations made by using the contents of the specification and the drawings of the present utility model, or direct/indirect applications to other related technical fields, are all included in the patent protection scope of the present utility model.

What is claimed is:

1. A ground wire spacer structure of a connector, comprising two groups of connector monoblocks that are symmetrical and spliced, wherein any group of the connector monoblocks comprise a housing, and the housing is provided with:

a plurality of groups of elastic pieces, wherein one end of the elastic piece is connected to a female socket of the connector, and the other end of the elastic piece is connected to a wire group of the connector;

a plurality of metal spacers, wherein the metal spacers are distributed between two adjacent groups of the elastic pieces and are used to separate the elastic pieces; and a conductive sheet mounted on the housing, wherein the conductive sheet is abutted against the plurality of spacers, the conductive sheet is connected to a ground wire in the wire group, and the metal spacers and the conductive sheet form a plurality of independent spaces for accommodating the plurality of groups of the elastic pieces respectively;

wherein the female socket is provided with a plurality of female socket spacers docked with the metal spacers and a plurality of partition plates for inserting the metal spacers, and each partition plate is provided with a slot for inserting the metal spacer;

one end of each metal spacer to be inserted into the slot is provided with a first inclined guide surface, one end of each female socket spacer is provided with a second inclined guide surface corresponding to the first inclined guide surface; when each metal spacer is inserted in place in the slot, the second inclined guide surface abuts the first inclined guide surface.

2. The ground wire spacer structure of the connector according to claim 1, wherein the metal spacer is provided as a structure made of a copper or stainless steel material.

3. The ground wire spacer structure of the connector according to claim 2, wherein the housing is provided as a plastic housing, and the housing and the elastic piece are provided as a one-piece injection molded structure.

4. The ground wire spacer structure of the connector according to claim 1, wherein two positioning lugs are symmetrically arranged at both ends of the conductive sheet, and the housing is provided with positioning and clamping holes for clamping with the positioning lugs.

5. The ground wire spacer structure of the connector according to claim 1, wherein the slot has a width greater than a thickness of the metal spacer, such that the slot provides a space configured to allow the end of each metal spacer to move along a width direction of the slot through a relative sliding movement between the first inclined guide surface and the second inclined guide surface.

6. The ground wire spacer structure of the connector according to claim 1, wherein any of the connector monoblocks is provided with a positioning post and a positioning hole for being spliced with another connector monoblock.

7. The ground wire spacer structure of the connector according to claim 1, wherein the plurality of partition plates are perpendicular to the plurality of female socket spacers and the metal spacers.

8. The ground wire spacer structure of the connector according to claim 1, wherein the first inclined guide surface is in sliding contact with the second inclined guide surface.

9. The ground wire spacer structure of the connector according to claim 1, wherein the first inclined guide surface and the second inclined guide surface are both flat surfaces.

* * * * *